(12) United States Patent  (10) Patent No.: US 8,332,259 B1
Zias et al.  (45) Date of Patent: Dec. 11, 2012

(54) METHOD AND SYSTEM FOR EVALUATING EXPANSION OF A BUSINESS

(75) Inventors: Jeff A. Zias, Los Altos, CA (US); Dante Emilio Cassanego, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/306,764

(22) Filed: Nov. 29, 2011

Related U.S. Application Data

(63) Continuation of application No. 12/264,144, filed on Nov. 3, 2008, now Pat. No. 8,095,412.

(51) Int. Cl.
*G06Q 10/00* (2006.01)
(52) U.S. Cl. ............ 705/7.34; 705/7.11; 705/7.29; 705/7.31; 705/7.32
(58) Field of Classification Search ............ 705/7.11, 705/7.29, 7.31–7.37
See application file for complete search history.

(56) References Cited

U.S. PATENT DOCUMENTS

| | | | | |
|---|---|---|---|---|
| 5,041,972 A * | 8/1991 | Frost | ............... | 705/7.32 |
| 5,680,305 A * | 10/1997 | Apgar, IV | ............... | 705/7.28 |
| 5,842,192 A * | 11/1998 | Garcia et al. | ............... | 706/45 |
| 5,930,764 A * | 7/1999 | Melchione et al. | ............... | 705/7.29 |
| 6,519,572 B1 * | 2/2003 | Riordan et al. | ............... | 705/16 |
| 6,871,140 B1 * | 3/2005 | Florance et al. | ............... | 701/516 |
| 6,952,661 B2 * | 10/2005 | Agrawala et al. | ............... | 703/2 |
| 8,085,990 B2 * | 12/2011 | Ofek | ............... | 382/113 |
| 2002/0152092 A1 * | 10/2002 | Bibas et al. | ............... | 705/1 |
| 2003/0028417 A1 * | 2/2003 | Fox | ............... | 705/10 |
| 2003/0033195 A1 * | 2/2003 | Bruce et al. | ............... | 705/10 |
| 2003/0097290 A1 * | 5/2003 | Kiefer | ............... | 705/8 |
| 2003/0097295 A1 * | 5/2003 | Kiefer | ............... | 705/10 |
| 2003/0149704 A1 * | 8/2003 | Yayoi et al. | ............... | 707/102 |
| 2005/0168436 A1 * | 8/2005 | Parzygnat et al. | ............... | 345/156 |
| 2005/0262050 A1 * | 11/2005 | Fagin et al. | ............... | 707/3 |
| 2008/0205768 A1 * | 8/2008 | Srivastava | ............... | 382/206 |
| 2010/0057645 A1 * | 3/2010 | Lauritsen | ............... | 706/11 |

OTHER PUBLICATIONS

ArcView Business Analyst White Paper with supplemental descriptive materials "See your business from a new perspective" and "Integrated Business Geographic Solutions" and "GIS for Site Analysis", Environmental Systems Research Institute (ESRI), Jan. 2000, 40 pages.

* cited by examiner

*Primary Examiner* — Lynda Jasmin
*Assistant Examiner* — Alan S Miller
(74) *Attorney, Agent, or Firm* — Osha Liang LLP

(57) ABSTRACT

A method for evaluating expansion of a business where the business is located in a first geographic area. The method includes receiving information about the business, querying a business information source and a demographic information source using the information, receiving data from the business information source and the demographic information source in response to the querying, processing the data using business expansion factors to obtain a rank order, where the data comprises a plurality of potential geographic areas for expanding the business, where the plurality of potential geographic areas are evaluated on the business expansion factors to determine a similarity to the first geographic area to obtain a rank order, and presenting, in the rank order, each of the plurality of potential geographic areas.

24 Claims, 10 Drawing Sheets

State in which your business is located?
302

North Carolina ▼

300

City in which your business is located?
304

Wilmington ▼

Age range of your typical customer?
306

From: 19 ▼    To: 29 ▼

Check the box that best describes your business?
308

☒ Goods    ☐ Services

What type of goods does your business deal in?
310

Baby supplies ▼

If the type of goods that applies to your business is not in the list above, check the box below and type in your business type on the line next to the checkbox.
312

☐ _____

Select a range that best fits your annual gross revenue?
314

$1,000,000 - $5,000,000 ▼

In what countries are you interested in expanding?
316

United States ▼

(If more than one, press the "Ctrl" key on your keyboard as you select each country.)
318

( Run Query 320 )    ( Clear Template 322 )    ( Cancel 324 )

FIGURE 3

State in which your business is located?
402

North Carolina ▼

City in which your business is located?
404

Wilmington ▼

Age range of your typical customer?
406

From: 35 ▼    To: 45 ▼

Check the box that best describes your business?
408

☐ Goods    ☒ Services

What type of services does your business deal in?
410

Consulting – Environmental Engineering ▼

If the type of services that applies to your business is not in the list above, check the box below and type in your business type on the line next to the checkbox.
412

☐ _____

Select a range that best fits your annual gross revenue?
414

$10,000,000 - $15,000,000 ▼

In what countries are you interested in expanding?
416

United States ▼

(If more than one, press the "Ctrl" key on your keyboard as you select each country.)
418

( Run Query 420 )    ( Clear Template 422 )    ( Cancel 424 )

FIGURE 4

METHOD AND SYSTEM FOR EVALUATING EXPANSION OF A BUSINESS

CROSS-REFERENCE TO RELATED APPLICATIONS

This application is a continuation of U.S. patent application Ser. No. 12/264,144, filed on Nov. 3, 2008, and entitled: "METHOD AND SYSTEM FOR EVALUATING EXPANSION OF A BUSINESS." Accordingly, this application claims benefit of U.S. patent application Ser. No. 12/264,144 under 35 U.S.C. §120. U.S. patent application Ser. No. 12/264,144 is hereby incorporated in its entirety.

BACKGROUND

Businesses from time to time feel a need to expand to new geographic areas. Often, though, businesses lack the expertise to determine the potential geographic areas for expanding its business. For example, the owner of a business located in Iowa City, Iowa, and providing environmental engineering services may want to expand to one or two other strategic locations in the United States. The owner may not have the expertise to make an educated determination as to where to expand.

If the owner of this business wants to expand, she may need to find a resource to assist her in determining where to expand. Consultants may be available in helping to generate and evaluate options, but this can be expensive. In addition, the results often may not lead to an optimal result for the owner of the business. Lacking the ability to efficiently and accurately determine and evaluate geographic locations for the owner of a business to expand that business may lead to lost opportunities or, in the worst case, a dissolution of the business because of poor decisions made in the expansion process that drain the financial resources of the company.

SUMMARY

In general, in one aspect, the invention relates to a method for evaluating expansion of a business where the business is located in a first geographic area, comprising receiving information about the business, querying a business information source and a demographic information source using the information, receiving data from the business information source and the demographic information source in response to the querying, processing the data using business expansion factors to obtain a rank order, wherein the data comprises a plurality of potential geographic areas for expanding the business, wherein the plurality of potential geographic areas are evaluated on the business expansion factors to determine a similarity to the first geographic area to obtain a rank order, and presenting, in the rank order, each of the plurality of potential geographic areas.

In general, in one aspect, the invention relates to a computer readable medium embodying instructions executable by a processor to perform method steps for evaluating business expansion, the instructions comprising functionality to receive information about the business, query a business information source and a demographic information source using the information, receive data from the business information source and the demographic information source in response to the querying, process the data using business expansion factors to obtain a rank order, wherein the data comprises a plurality of potential geographic areas for expanding the business, wherein the plurality of potential geographic areas are evaluated on the business expansion factors to determine a similarity to the first geographic area to obtain a rank order, and present, in the rank order, each of the plurality of potential geographic areas.

In general, in one aspect, the invention relates to a system for evaluating business expansion, comprising an inquiry storage center configured to store a system inquiry template and inquiry records, a business growth networking system operatively connected to a business information source, a demographic information source, and the inquiry storage center and wherein the business growth networking system is configured to receive information about the business, query the business information source and the demographic information source using the information, receive data from the business information source and the demographic information source in response to the querying, and process the data using business expansion factors to obtain a rank order, wherein the data comprises a plurality of potential geographic areas for expanding the business, wherein the plurality of potential geographic areas are evaluated on the business expansion factors to determine a similarity to the first geographic area to obtain a rank order; and presenting in the rank order each of the plurality of potential geographic areas.

Other aspects of the invention will be apparent from the following description and the appended claims.

BRIEF DESCRIPTION OF DRAWINGS

FIGS. 3, 4, 5, 6A, 6B, and 7 show examples in accordance with one or more embodiments of the invention.

DETAILED DESCRIPTION

Figure 1:
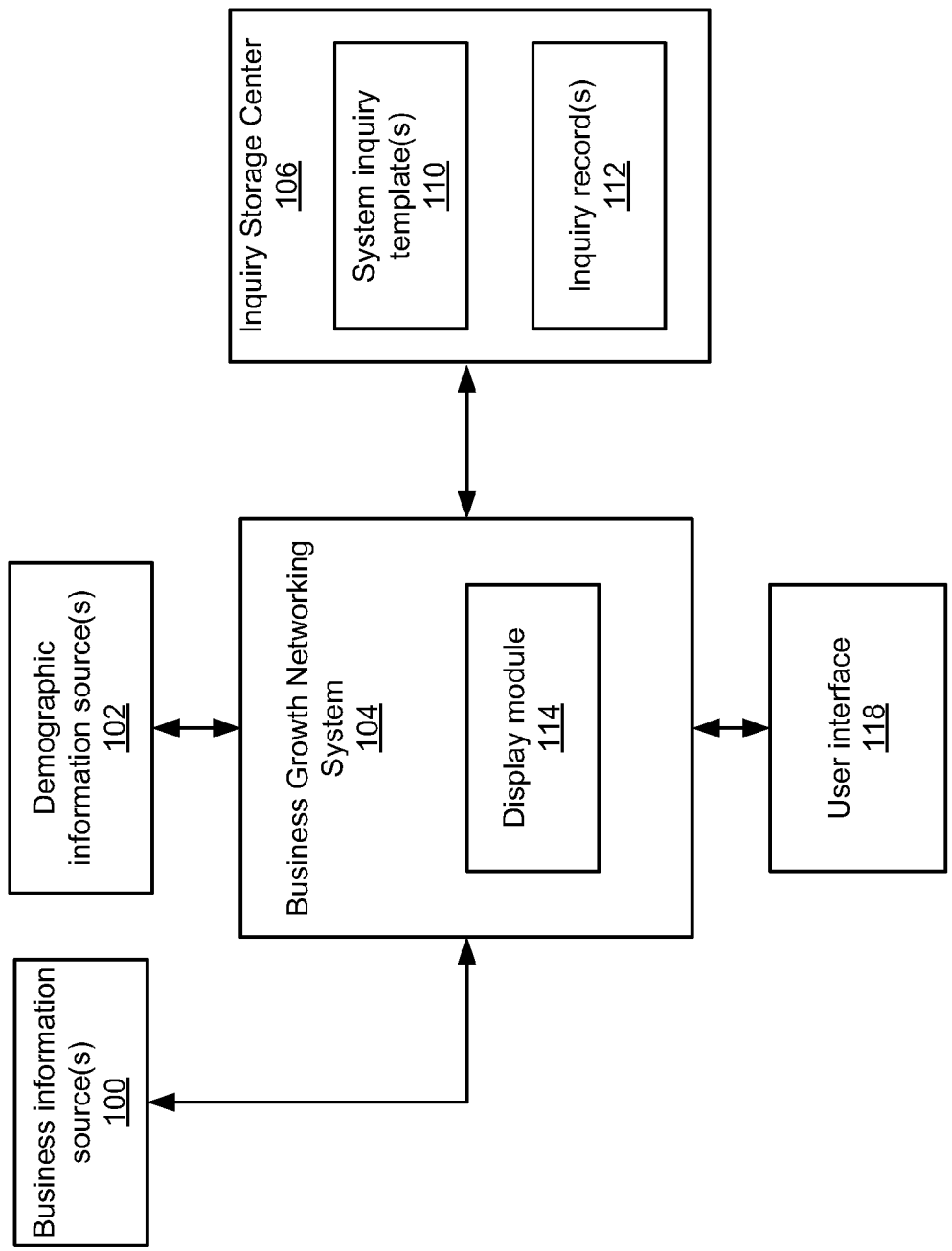
FIG. 1 shows a flow diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to evaluate the expansion of a business. More specifically, embodiments of the invention enable a business owner to determine potential geographic areas for expanding the business.

FIG. 1 shows a flow diagram of a system for evaluating expansion of a business in accordance with one or more embodiments of the invention. As shown in FIG. 1, the system includes a business information source(s) (100); a demographic information source(s) (102); a business growth networking system (104), which includes a display module (114); a user interface (118); and an inquiry storage center (106), which includes a system inquiry template(s) (110) and an inquiry record(s) (112). Each of these components is described below. One of ordinary skill in the art will appreciate that embodiments of the invention are not limited to the configuration shown in FIG. 1.

In one embodiment of the invention, the business information source(s) (100) may be one or more sources that include historical and/or regularly updated current business information that pertains to the potential geographic areas in the country of interest that is the subject of the business expansion. Each business information source (100) is operatively connected to the business growth networking system (104). Each business information source (100) is configured to receive a query from the business growth networking system (104) to identify potential geographic locations that correlate to the business profile of a business that is considering expansion. In response to each query, each business information source (100) is configured to send responsive data to the business growth networking system (104). The responsive data may include, but is not limited to, financial data, industry-specific data, and performance data related to the country and type of business that is subject to the query.

In one embodiment of the invention, the business information sources(s) (100) may include information on publicly traded companies, which may be obtained from annual reports and various filings with governmental bodies such as the Securities and Exchange Commission. Further, the business information source(s) (100) may include information about privately held companies/businesses. The information related to privately-held companies/businesses may be compiled by third-parties and made available for a fee and/or a subscription rate. As an example, a third-party may conduct surveys with TurboTax® or Quicken® subscribers that own privately-held companies/businesses to collect information about those subscribers, and the third-party may offer results of those surveys for a fee or subscription rate. (TurboTax is a registered service mark of Intuit Inc. of Mountain View, Calif., and Quicken is a registered trademark of Intuit Inc. of Mountain View, Calif.) In another example, companies may host a forum or community (virtual or actual) where members of that forum or community act as resources for other members of that forum or community. As an example, TurboTax® subscribers that own privately-held companies/businesses may access the Turbo Tax® Live community, where those Turbo Tax® subscribers may post questions, which are answered by other Turbo Tax® subscribers with knowledge of that particular issue. In one embodiment of the invention, a business using a financial software system(s) may be a business information source (100). In such cases the business allows some or all of the information related to the business to be accessed and/or available to others. For example, a business that uses Quicken® may have some or all of the information related to the business accessible via Quicken®. In one or more embodiments, a group of businesses using the same financial software system may allow some or all of the information related to each of the businesses to be aggregated, where the aggregation serves as a business information source (100). For example, businesses that use Quicken® may have some or all of the information related to the business to be accessed such that it can be aggregated by a host, which functions in part as a business information source (100).

In one embodiment of the invention, the demographic information source(s) (102) may be one or more sources that include historical and/or regularly updated current demographic information that pertains to the potential geographic areas in the country of interest that is the subject of the business expansion. Each demographic information source (102) is operatively connected to the business growth networking system (104). Each demographic information source (102) is configured to receive a query from the business growth networking system (104) to identify potential geographic locations that correlate to the demographics of the geographic location of a business that is considering expansion. In response to each query, each demographic information source (102) is configured to send responsive data to the business growth networking system (104). The responsive data may include, but is not limited to, population, income, age, sexual and cultural diversity, and economic information related to the geographic location and the type of business that is subject to the query.

In one embodiment of the invention, the demographic information sources (102) may be public or private and may be local, domestic, or international in scope. Further, the demographic information sources may be regularly updated. Examples of demographic information sources (102) may include, but are not limited to, government sources (e.g., the International Data Base by the U.S. Census Bureau), sources from educational institutions (e.g., Census & Demographic Data by Mansfield University), and private sources (e.g., GeoLytics, Catosphere®), which may be free or available for a fee. (Catosphere is a registered service mark of Catenate LLC of Manlius, N.Y.)

In one embodiment of the invention, the business growth networking system (104) is configured to generate and issue queries to both the business information source(s) (100) and to the demographic information source(s) (102). The business growth networking system (104) is also configured to receive data in response to a query from the business information source(s) (100) and from the demographic information source(s) (102). In addition, the business growth networking system (104) is configured to evaluate the data returned by the business information source(s) (100) and the demographic information source(s) (102) in response to a query to determine the potential geographic areas that the user may consider in expanding her business. In one or more embodiments of the invention, the business growth networking system (104) may be configured to generate forecasts, using the data returned by the business information source(s) (100) and the demographic information source(s) (102), for some point in time in the future. The results of the evaluation may be presented to the user via the user interface (118). The manner in which the results are presented is determined by the display module (114) (described below).

In one embodiment of the invention, the query that the business growth networking system (104) is configured to generate and issue to the business information source(s) (100) and to the demographic information source(s) (102) is derived from information supplied by the user via the user interface (118). The business growth networking system (104) may use one or more relational data models, such as the Universal Customer System (UCS), to retrieve the data for the query. Further, the business growth networking system (104) may use an application programming interface (API) to interface with the information sources (e.g., business information source(s) (100) and to the demographic information source(s) (102)). The business growth networking system (104) may also use other sources to interface with the information sources (e.g., business information source(s) (100) and to the demographic information source(s) (102)), including but not limited to subscription services and aggregation systems.

The business growth networking system (104) includes a display module (114), which is configured to facilitate communication between the business growth networking system (104) and the user interface (118). The output from each query is presented in various manners (e.g., electronically, in hard copy, etc.) and forms (e.g., tables, graphs, maps, pictures, etc.) via the display module (114). The display module (114) is also configured to send notifications from the business growth networking system (104) via the user interface (118). When the user provides a response to a question or gives a command, the response or command is sent from the user interface (118) to the display module (114).

In one embodiment of the invention, the inquiry storage center (106) corresponds to any persistent storage system configured to (i) receive queries from the business growth networking system (104), (ii) service any such queries to generate responses, (iii) return the generated responses to the business growth networking system (104), (iv) maintain the system inquiry template(s) (110), and (v) populate and maintain the inquiry record(s) (112). The persistent storage within the inquiry storage center (106) may correspond to any persistent storage medium(s).

In one embodiment of the invention, the system inquiry template (110) includes information entered by the user into each field of the template (see FIG. 3). In one embodiment of the invention, the system inquiry template (110) is interactive. For example, as the user starts populating fields in the template, other fields presented to the user may vary/change in response. Examples of the system inquiry template (110) are described in FIGS. 3-4.

In one embodiment of the invention, each inquiry record (112) includes a query generated from information obtained provided by a user in the system inquiry template (110). In addition, the inquiry record (112) may also include the results of the query (or queries) and subsequent evaluation by the business growth networking system. For example, the inquiry record (112) may include: (i) a query to the demographic information source(s) (102), (ii) the results of the query to the demographic information source(s) (102), (iii) a query to the business information source(s) (100), (iv) the results of the query to the business information source(s) (100), and (v) the evaluation of the aforementioned results by the business growth networking system (104).

Those skilled in the art will appreciate that the aforementioned components may be located on a single system or distributed across multiple systems. Further, in embodiments in which the components are distributed across multiple systems, the distributed components may communicate over wired and/or wireless connections using well known communication protocols.

Figure 2:
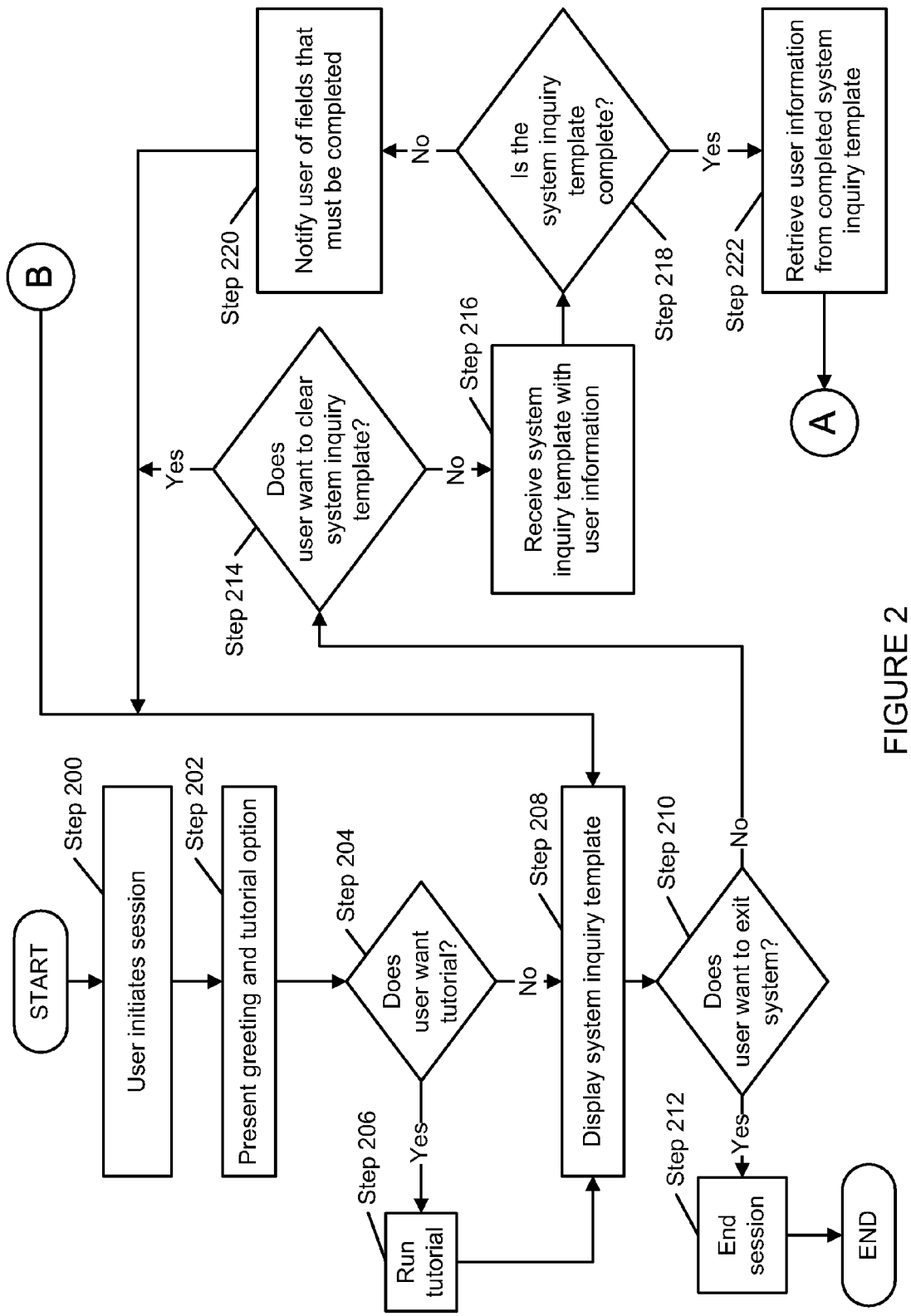
FIG. 2 shows a flowchart in accordance with one or more embodiments of the invention.
Figure 2:
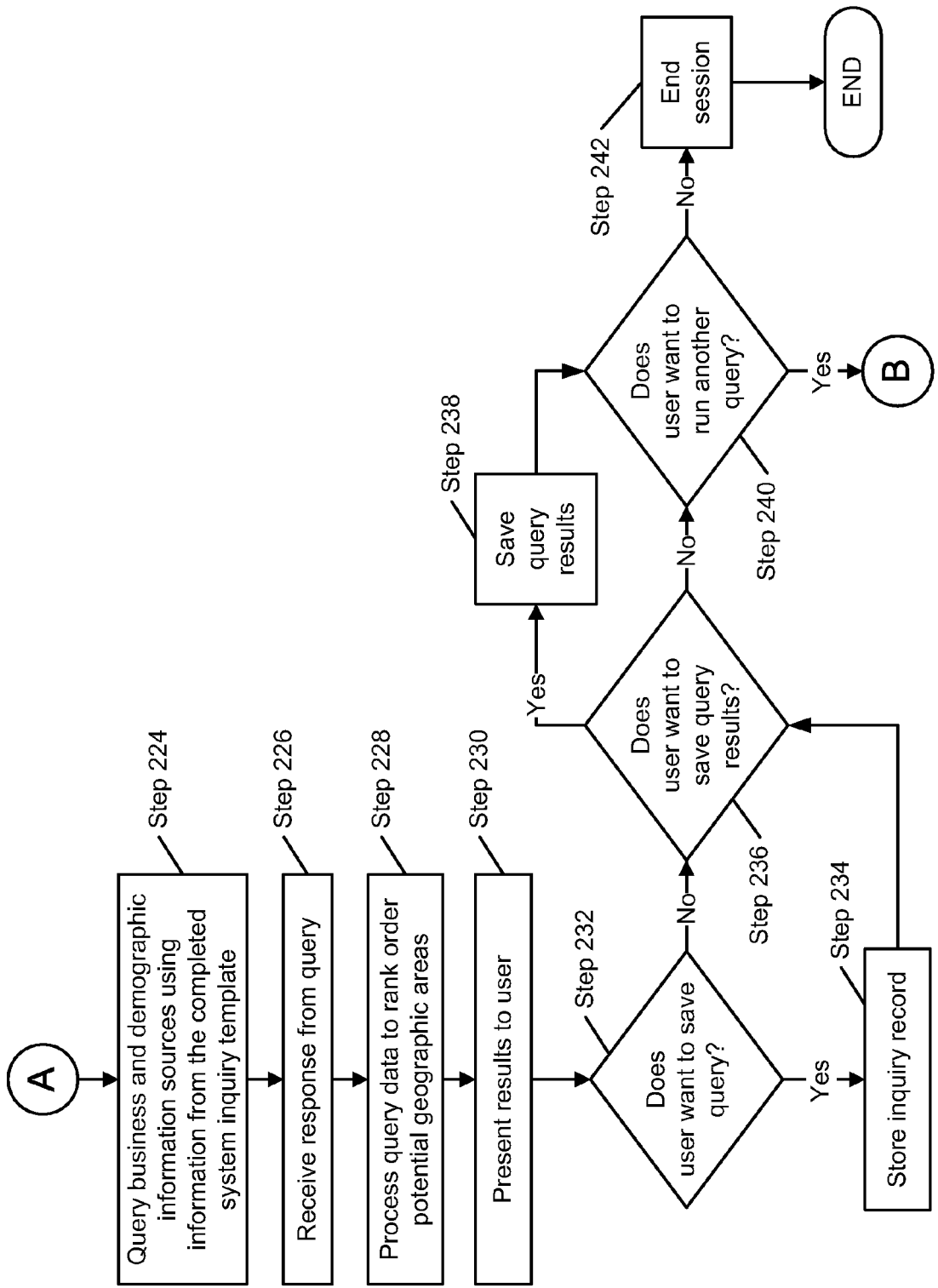

FIG. 2 shows a flowchart for operation executing a query for evaluating the expansion of a business in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Further, in one or more of the embodiments of the invention, one or more of the steps described below may be omitted, repeated, and/or performed in a different order. Accordingly, the specific arrangement of steps shown in FIG. 2 should not be construed as limiting the scope of the invention.

In Step 200, the presence of a user initiating a session is determined in accordance with one or more embodiments of the invention. This determination may be made after the user provides a form of registration, such as a user name and password, but the determination may also occur by the user initiating the business growth networking system (104) without a form of registration. If the user is using the business growth networking system (104) for the first time, she may be asked to register by providing certain information such as her name, the name of the company, the address of the company, the line of business in which the company is involved, the number of employees at the company, and the number of years the company has existed.

In Step 202, a greeting message is presented to the user that asks the user whether she would like to participate in a tutorial before using a business growth networking system in accordance with one or more embodiments of the invention. In Step 204, in accordance with one or more embodiments of the invention, a determination is made about whether the user requested a tutorial. If the user requests a tutorial, then the method proceeds to Step 206. If the user did not request a tutorial, then the process proceeds to Step 208.

In Step 206, the user participates in the tutorial, which familiarizes her with the various screens she may encounter and information she may need to provide in accordance with one or more embodiments of the invention. The user may have the ability to end the tutorial at any time.

In Step 208, the user is prompted to enter data about her business in accordance with one or more embodiments of the invention. Examples of the information provided by the user may include: the state, province, territory, or other division of land in a country in which the business is located; the city in which the business is located; the age range of the typical customer of the business; whether the business deals in goods or services; the specific type of goods the business sells or services in which the business is engaged; the annual gross revenue of the business; and the country in which the user is interested in expanding her business. The user may be asked to enter the data using text boxes, drop-down selections, check boxes, radio buttons, free-form entry, or any combination thereof.

In one or more embodiments of the invention, more than one location may be entered into a given field. For example, for a single query, the user may be able to select more than one country in which she wants to consider expanding her business. In addition, as discussed above, the choices in a given field of a data entry template may change, depending on the selection that the user made in a previous field. For example, if the user chooses North Carolina in the field asking her the state in which her business is located, then only cities in North Carolina may appear as choices for the next field, which asks the city in which her business is located. Similarly, the fields themselves may also change, depending on the selection made by the user in a previous field. For example, if the user selects that her business deals in goods rather than services, then the next field asks the user the type of goods in which her business sells.

In one or more embodiments of the invention, if the user owns an e-business, a catalog business, or some other type of business where the business does not operate in a particular city but rather caters to customers in a state, province, country, or some other region or territory, the data entry template may be modified to include a field that recognizes this type of business and modifies the remaining fields accordingly. Also, in one or more embodiments, the user may select a time in the future to expand her business, creating a forecast of potential geographic areas using historical and current data returned from the business information source(s) (100), and the demographic information source(s) (102) to create the forecast.

In Step 210, the user determines whether she wants to exit without submitting a query in accordance with one or more embodiments of the invention. If the user chooses to exit without submitting a query, the session ends in Step 212. If the user does not want to exit before submitting a query, the process proceeds to Step 214.

In Step 214, the user determines whether she wants to clear the fields in the data entry template before submitting a query. If the user decides to clear the fields in the data entry template before submitting a query, then a command is issued to clear the fields of the data entry template. The process then proceeds to Step 208. If the user decides not to clear the fields in the data entry template before submitting a query, then a request for a query is submitted using the information that the user entered in the fields of the data entry template (110). At this point, the process proceeds to Step 216.

In Step 216, a request for a query is received using the user information from the data entry template, and the process proceeds to Step 218, where a determination is made whether the user has completed all of the fields in the data entry template. If the user fails to complete all of the fields in the data entry template, then a query is unable to generate, and the process proceeds to Step 220. If the user completes all of the fields in the data entry template, then a query is generated, and the process proceeds to Step 222.

In Step 220, the user receives a message notifying her that all fields must be completed in order to submit a query. The process then proceeds to Step 208. In one or more embodiments of the invention, the fields of the data entry template retain the information that the user entered before trying to submit the request for a query in Step 214. In addition, the user may be notified as to which specific fields were incomplete or were not completed properly. Such notification may be communicated by showing the deficient fields in red or some color other than the default color for the data entry template by providing a message to notify the user of the specific fields that are deficient, or by some other mechanism.

In Step 222, the information from fields in the data entry template is extracted to generate a query (or multiple queries). In Step 224, the query is generated and issued. The query (or multiple queries) is issued to one or more information sources (e.g., business information source(s) (100) and/or demographic information source(s) (102)).

In Step 226, the results of the query are received in accordance with one or more embodiments of the invention. The data received from each information source may include geographic areas within the country designated by the user into which the business may be expanded. The process then proceeds to Step 228.

In Step 228, the results of the query from Step 226 are evaluated using one or more business expansion factors, to create a rank order of the potential geographic areas to which the business may expand. In one embodiment of the invention, using the business expansion factors, the results of the query are sorted into a rank order of the potential geographic areas, where the potential geographic areas with similar business and demographic characteristics have the higher rankings relative to other potential geographic areas which do not have the same characteristics. In one embodiment of the invention, the potential geographic areas with the higher rankings have similar business and demographic characteristics to the business, and these potential geographic areas should be considered for business expansion by the business owner.

The business expansion factors may initially be set by default, and/or they may be modified or defined by the user. Using the business expansion factors, a determination is made regarding the potential geographic areas that are similar to the geographic area where the business is located. The business expansion factors include, but are not limited to, overall population, population within the range of ages for the typical customer of the business, the number of businesses of the specific kind owned by the owner that are located in the potential geographic area, median income, and per capita income.

In comparing the value of a business expansion factor in the geographic area where the business is located with the value of the business expansion factor in another geographic area, the higher the correlation between the areas, the higher the rank in the rank order for the geographic area. As an example, if the median income of the geographic area in which the business of the owner is located is $75,000 and if the median income of a potential geographic area is $75,000, then the potential geographic area receives a high ranking for this business expansion factor. As a further example, if there are already a large number of businesses of the type owned by the owner in a potential geographic area, showing that the market may be saturated, then the potential geographic area receives a lower ranking for this business expansion factor than another potential geographic area that has no businesses of this type, which may indicate that there is likely a strong demand for this type of business.

The rating of the potential geographic areas may be based on a weighted-average mathematical calculation or some other mechanism for rank ordering potential geographic areas based on one or more business expansion factors.

In one or more embodiments of the invention, the rank order of potential geographic areas is determined by a weighted-average mathematical calculation of the business expansion factors and the correlation to the value of the business expansion factors of the business. The weighted-average score for a single business expansion factor for a potential geographic area is the scope (defined below) multiplied by the measure (defined below) multiplied by the weighting. The sum of the weighted-average scores for all business expansion factors for a potential geographic area generates the weighted-average score for that potential geographic area.

In one or more embodiments of the invention, the scope in the weighted-average mathematical calculation is one or more boundaries for a business expansion factor that limits the potential geographic areas that are returned in response to a query. The scope of each of the business expansion factors may be set by default, or the user may set the scope of each business expansion factor. In addition, the user may elect not to set a scope for a business expansion factor. As an example, when considering the population of potential geographic areas in comparison to the geographic area where the business is located, the default scope may be to only consider potential geographic areas that have a population that are within ten percent of the population of the geographic area where the business is located. Alternatively, the user may set the scope of the population such that only potential geographic areas that have a population within 10,000 of the population of the geographic area where the business is located may be considered. The lower and upper bounds for the scope do not need to be symmetrical. For example, the scope for population may be −5 percent to +10 percent. Alternatively, the scope for population may be only an upper limit of 100,000 with no lower limit.

In one or more embodiments of the invention, the measure in the weighted-average mathematical calculation is a value assigned to a business expansion factor, which depends on the value of the business expansion factor in a potential geographic area relative to the value of the business expansion factor in the geographic area in which the business is located. The measure of the business expansion factors in terms of the weighted average may be set by default, or the user may define the measure of each business expansion factor. For example, when considering the per capita income of a geographic area, the default measure may be: (i) to assign a value of 5 if the per capita income of a geographic area is greater than $100,000; (ii) to assign a value of 4 if the per capita income of a geographic area is between $90,000 and $100,000; (iii) to assign a value of 3 if the per capita income of a geographic area is between $75,000 and $90,000; (iv) to assign a value of 2 if the per capita income of a geographic area is between $50,000 and $75,000; (v) to assign a value of 1 if the per capita income of a geographic area is between $30,000 and $50,000; and (vi) to assign a value of zero if the per capita income of a geographic area is less than $30,000. Alternatively, the user may set the measure of per capita income to be: (i) to assign a value of 3 if the per capita income of a geographic area is greater than $85,000; (ii) to assign a value of 2 if the per capita income of a geographic area is between $60,000 and $85,000; (iii) to assign a value of 1 if the per capita income of a geographic area is between $40,000 and $60,000; and (iv) to assign a value of zero if the per capita income of a geographic area is less than $40,000. The lower and upper bounds for the measure do not need to be symmetrical. For example, the measure for per capita income may be −5 percent to +10 percent. Alternatively, the measure for per capita income may be only a lower limit of $45,000 with no upper limit.

In one or more embodiments of the invention, the weighting in the weighted-average mathematical calculation is a measure of importance of a business expansion factor. The weighting of the business expansion factors in terms of the weighted average may be set by default, or the user may define the weighting of each business expansion factor. In one embodiment of the invention, the sum of the weighting for all of the business expansion factors equals 100 percent. For example, when considering the number of businesses of the same specific type in the potential geographic area as the business being considered for expansion, the default weighting for this factor may be 35 percent. Alternatively, the user may set the weighting for this factor at 60 percent, indicating that the owner places a high level of importance on this business expansion factor relative to the other business expansion factors. It is possible that the user may set the weighting for one or more business expansion factors to 0 percent if she feels that those business expansion factors have no impact on determining the potential geographic areas to expand her business.

Consider the following example in which the user determines that only three business expansion factors are used to create the rank order of potential geographic areas. The three business expansion factors are population, median income, and the number of businesses of the same specific type in the potential geographic area as the business being considered for expansion. In one embodiment of the invention, to arrive at only these three business expansion factors, the user sets the weighting of all other business expansion factors, such as per capita income and population within the range of ages for the typical customer of the business, to zero. Further, in this example, the business is located in a geographic area with a population of 40,000 and a median income of $75,000.

In further explanation of the example of the weighted-average mathematical calculation, for the population, the user defines the scope as +/−10,000 of the population of the geographic area in which her business is located, and the user defines the weighting as 35 percent. The user defines the measure as 5 if the population of the potential geographic area is +/−2,500 of the population of the geographic area in which her business is located; 3 if the population of the potential geographic area is between +/−2,501 and +/−5,000 of the population of the geographic area in which her business is located; and 1 if the population of the potential geographic area is between +/−5,001 and the scope of the population of the geographic area in which her business is located.

In further explanation of the example of the weighted-average mathematical calculation, for the median income, the user defines the scope as +/−10 percent of the median income of the geographic area in which her business is located, and the user defines the weighting as 25 percent. The user defines the measure as 5 if the median income of the potential geographic area is +/−2 percent of the median income of the geographic area in which her business is located; 4 if the median income of the potential geographic area is between +/−2 percent and +/−4 percent of the median income of the geographic area in which her business is located; 3 if the median income of the potential geographic area is between +/−4 percent and +/−6 percent of the median income of the geographic area in which her business is located; 2 if the median income of the potential geographic area is between +/−6 percent and +/−8 percent of the median income of the geographic area in which her business is located; and 1 if the median income of the potential geographic area is between +/−8 percent and the scope of the median income of the geographic area in which her business is located.

In further explanation of the example of the weighted-average mathematical calculation, for the number of businesses of the same specific type in the potential geographic area as the business being considered for expansion, the user elects not to set a scope (therefore the default is set to 1), and the user defines the weighting as 40 percent The user defines the measure as 10 if the number of businesses of the same specific type in the potential geographic area as the business being considered for expansion is zero; 5 if the number of businesses of the same specific type in the potential geographic area as the business being considered for expansion is 1 or 2; and zero if the number of businesses of the same specific type in the potential geographic area as the business being considered for expansion is 3 or more.

In further explanation of the example of the weighted-average mathematical calculation, after the information source(s) send data in response to a query, the results of the query include 3 potential geographic areas. The first potential geographic area has a population of 45,000, a median income of $65,000, and no other businesses of the same specific type. The second potential geographic area has a population of 30,000, a median income of $80,000, and 2 other businesses of the same specific type. The third potential geographic area has a population of 41,000, a median income of $74,000, and three other businesses of the same specific type. As a result, the first potential geographic area has a weighted-average mathematical calculation of 4.7625, the second potential geographic area has a weighted-average mathematical calculation of 3.00, and the third potential geographic area has a weighted-average mathematical calculation of 2.85. As a result, the first potential geographic area ranks highest in the rank order, the third potential geographic area ranks second in the rank order, and the second potential geographic area ranks last in the rank order.

A person of ordinary skill in the art realizes that there are other ways to establish a rank order of potential geographic areas using the business expansion factors. The above method and example are not meant to limit the scope of the invention.

In one or more embodiments of the invention, the results of the query from Step 226 are evaluated using the data returned by the business information source(s) and the demographic information source(s) to generate a forecast of one or more business expansion factors for potential geographic areas at some time in the future, as the user may define in Step 208.

Continuing with FIG. 2, in Step 230, the results of the query are presented to the user. In one or more embodiments of the invention, the user determines the format in which to view the output (regardless of whether electronic or hard copy). Examples of such output formats are a map, a spreadsheet, a graph, any other type of format for presented results, or any combination thereof. In one embodiment of the invention, a map may be output in different formats, including using a virtual map where the distance from a potential geographic area to the city that the business is located is directly proportionate to the rank order of that potential geographic area under the set of business expansion factors from the query. In other words, the potential geographic area that ranks highest in the query is the shortest distance on the map, in terms of virtual miles, to the city where the business is located.

In one or more embodiments, the results of the query may be presented to the user in a multi-dimensional display, where each dimension is represented by a business expansion factor. In further embodiments of the invention, the multi-dimensional display may be integrated with a map. An example of a map format, using the concept of virtual miles and of the multi-dimensional display, is described in FIGS. 6A and 6B, respectively.

In Step 232, the user determines whether she wants to save the query. If the query is to be saved, the process proceeds to Step 234, where the query is stored as a record (e.g., inquiry record(s) (112)) in a repository (e.g., the inquiry storage center (106)). Once the query is stored, the process proceeds to Step 236. Alternatively, the process proceeds to Step 236 without saving the query.

Figure 7:
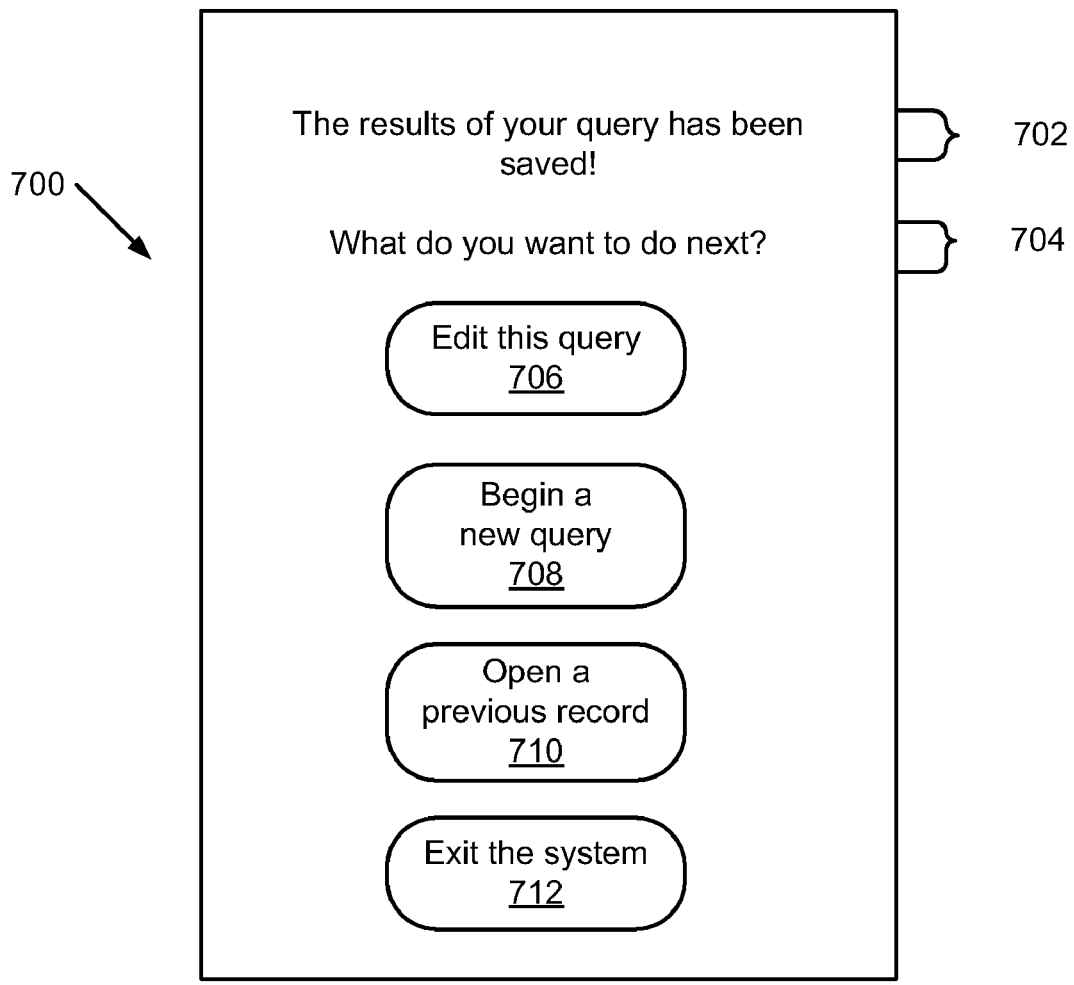

In Step 236, the user determines whether she wants to save the results of the query. If the results of the query are to be saved, then the process proceeds to Step 238, where the results of the query are stored to a device chosen by the user. The results of the query may be stored in a repository (e.g., the inquiry storage center (106)). An example of a screenshot that is presented to the user is shown in FIG. 7 (described below). Once the results of the query are saved, the process proceeds to Step 240. If the results of the query are not to be saved, then the process proceeds to Step 240.

In Step 240, the user determines whether she wants to submit another query. If the user wants to submit another query, then the process proceeds to Step 208. In one or more embodiments of the invention, the fields of the data entry template retain the information that the user entered from the query that was submitted in Step 224. If the user does not want to submit another query, then the process proceeds to Step 242, where the session ends.

FIGS. 3 and 4 show example presentations of a system inquiry template (110) of FIG. 1 in accordance with one or more embodiments of the invention. FIGS. 3 and 4 are merely exemplary and not intended to limit the scope of the invention.

In one or more embodiments of the invention, FIG. 3 shows an example presentation (300) of a system inquiry template (100) of FIG. 1. The example presentation (300) includes a template with the following: (i) the state that the business is located field (302); (ii) the city that the business is located field (304); (iii) the age range of the typical customer field (306); (iv) the general type of business field (308); (v) the specific type of business field (310); (vi) free form entry for specific type of business field (312); (vii) annual gross revenue of the business field (314); (viii) country for expansion field (316); (ix) directions on how to select more than one country for expansion (318); and a series of response options (320, 322, 324) from which the user chooses how to proceed. This example is for explanatory purposes only and is not intended to limit the scope of the invention. Other messages and response options may be shown, both for the circumstance of this example as well as for other events. In addition, there may be more or fewer parts to the message or series of response options, and in different order, than what is shown in this example. There may also be multiple messages or response options to convey what this example shows.

The state that the business is located field (302) is configured to store the state, province, territory, or other division of land in a country in which the business is located. The state, province, territory, or other division of land in a country may be for the United States or for any other country. In this case, the business is located in North Carolina, and the state is chosen from a drop-down menu. The city that the business is located field (304) is configured to store the city in which the business is located. The choices in this field may be based on the response of the user in the state that the business is located field (302), allowing only cities that exist in that state to appear as options for the user. In this case, the business is located in the city of Wilmington, and the city is chosen from a drop-down menu.

The age range of the typical customer field (306) is configured to store the age range of the typical customer of the business, and the user selects the lower and upper end of the range. In this case, the age of the typical customer for this business ranges from 19 to 29, and the each age in the range is chosen from an electronic drop-down list. The general type of business field (308) is configured to store whether the business deals in goods or services. The options may be presented in a number of formats, such as radio buttons or check boxes. In this case, the business deals in goods, and a check box is used to make the selection.

The specific type of business field (310) is configured to store the type of goods or services in which the business deals. This is an example of how the system inquiry template (110) of FIG. 1 recognizes the entry of a previous field to change the question for a later field. Specifically, because the user selected "goods" in the general type of business field (308), the question in the specific type of business field (310) is presented in terms of goods, not in terms of services. In this example, the business deals in baby supplies.

The free form entry for specific type of business field (312) is configured to allow the user to enter the specific type of goods or services in which her business deals and store the information that is entered. This field may be necessary if the business deals in goods or services that are not common or if the user is unable to find a selection provided for this field. In this example, the user found "baby supplies" in the specific type of business field (310), and so she did not need to manually enter the type of goods in which her business deals in the free form entry for specific type of business field (312).

The annual gross revenue of the business field (314) is configured to store an appropriate range to reflect the annual gross revenue of the business. In this case, the annual gross revenue of the business falls between $1,000,000 and $5,000,000, and the range of gross revenues is chosen from a drop-down menu. The country for expansion field (316) is configured to store the country that the user would like to consider for expanding her business. The user may select only one country, as in this example where the user chose the United States, or a multiple of countries. All countries in the world may be selected by the user. In one embodiment of the invention, if the user wants to select more than one country, the directions on how to select more than one country for expansion (318) instructs the user that she may do so by pressing the "Ctrl" key on her keyboard as she selects each country from the list in the country for expansion field (316).

The series of response options (320, 322, 324) is configured to allow the user to select how to proceed from the system inquiry template (110) of FIG. 1. This series of response options (320, 322, 324) may be presented to the user in a variety of forms. In this case, the series of response options (320, 322, 324) are in the form of pushbuttons with the specific labels "Submit Query", "Clear Template", and "Cancel". If the user selects the Submit Query (320) button, the information in the fields of the system inquiry template (110) of FIG. 1 are extracted and a query (queries) is generated and submitted. If the user selects the Clear Template (322) button, the fields in the system inquiry template (110) of FIG. 1 are cleared, and the user may be required to fill in all of the fields again before being able to submit a query. If the user selects the Cancel (324) button, she exits without submitting a query. Those skilled in the art will appreciate that mechanisms other than pushbuttons may be used to allow the user to enter his selection and that the wording of the response options may vary.

In one or more embodiments of the invention, FIG. 4 shows an example presentation (400) of a system inquiry template (100) of FIG. 1. The example presentation (400) includes a template with the following: (i) the state that the business is located field (402); (ii) the city that the business is located field (404); (iii) the age range of the typical customer field (406); (iv) the general type of business field (408); (v) the specific type of business field (410); (vi) free form entry for specific type of business field (412); (vii) annual gross revenue of the business field (414); (viii) country for expansion field (416); (ix) directions on how to select more than one country for expansion (418); and a series of response options (420, 422, 424) from which the user chooses how to proceed. This example is for explanatory purposes only and is not intended to limit the scope of the invention. Other messages and response options may be shown, both for the circumstance of this example as well as for other events. In addition, there may be more or fewer parts to the message or series of response options, and in different order, than what is shown in this example. There may also be multiple messages or response options to convey what this example shows.

The state that the business is located field (402) is configured to store the state, province, territory, or other division of land in a country in which the business is located. The state, province, territory, or other division of land in a country may be for the United States or for any other country. In this case, the business is located in North Carolina, and the state is chosen from an electronic drop-down list. The city that the business is located field (404) is configured to store the city in which the business is located. The choices in this field may be based on the response of the user in the state that the business is located field (402), allowing only cities that exist in that state to appear as options for the user. In this case, the business is located in the city of Wilmington, and the city is chosen from a drop-down menu.

The age range of the typical customer field (406) is configured to store the age range of the typical customer of the business, and the user selects the lower and upper end of the range. In this case, the age of the typical customer for this business ranges from 35 to 45, and the each age in the range is chosen from an electronic drop-down list. The general type of business field (408) is configured to store whether the business deals in goods or services. The options may be presented in a number of formats, such as radio buttons or check boxes. In this case, the business deals in goods, and a check box is used to make the selection.

The specific type of business field (410) is configured to store the type of goods or services in which the business deals. This is an example of how the system inquiry template (110) of FIG. 1 recognizes the entry of a previous field to change the question for a later field. In this example, because the user selected "services" in the general type of business field (408), the question in the specific type of business field (410) is presented in terms of services, not in terms of goods. In this example, the business deals in environmental engineering consulting.

The free form entry for specific type of business field (412) is configured to allow the user to enter the specific type of goods or services in which her business deals and store the information that is entered. This field may be necessary if the business deals in goods or services that are not common or if the user is unable to find a selection provided for this field. In this example, the user found "Consulting—Environmental Engineering" in the specific type of business field (410), and so she did not need to manually enter the type of services in which her business deals in the free form entry for specific type of business field (412).

The annual gross revenue of the business field (414) is configured to store an appropriate range to reflect the annual gross revenue of the business. In this case, the annual gross revenue of the business falls between $10,000,000 and $15,000,000, and the range of gross revenues is chosen from an electronic drop-down list. The country for expansion field (416) is configured to store the country that the user would like to consider for expanding her business. The user may select only one country, as in this example where the user chose the United States, or a multiple of countries. All countries in the world may be selected by the user. In one embodiment of the invention, if the user wants to select more than one country, the directions on how to choose more than one country for expansion (418) instructs the user that she may do so by pressing the "Ctrl" key on her keyboard as she selects each country from the list in the country for expansion field (416).

The series of response options (420, 422, 424) is configured to allow the user to choose how to proceed from the system inquiry template (110) of FIG. 1 and stores the choice of the user. This series of response options (420, 422, 424) may be presented to the user in a variety of forms. In this case, the series of response options (420, 422, 424) are in the form of pushbuttons, and they include the specific labels "Submit Query", "Clear Template", and "Cancel". If the user selects the Submit Query (420) button, the information in the fields of the system inquiry template (110) of FIG. 1 are extracted and a query is submitted. If the user selects the Clear Template (422) button, the fields in the system inquiry template (110) of FIG. 1 clear, and the user may be required to fill in all of the fields again before being able to submit a query. If the user selects the Cancel (424) button, she exits without submitting a query. Those skilled in the art will appreciate that mechanisms other than pushbuttons may be used to allow the user to enter his selection and that the wording of the response options may vary.

Figure 5:
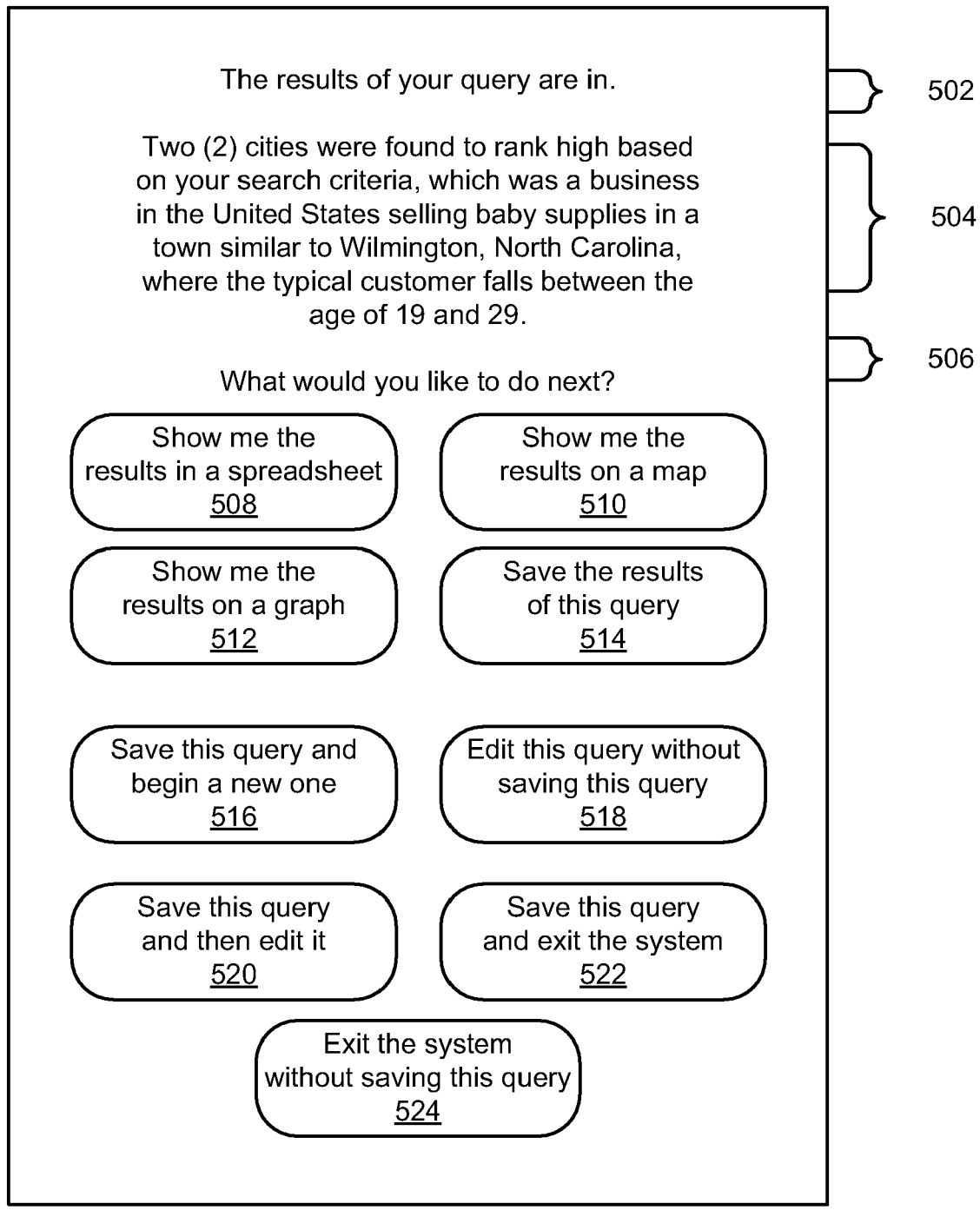

FIG. 5 shows an example of a screenshot (500) that is presented to the user after a query is executed and the results of the query are analyzed as discussed above in accordance with one or more embodiments of the invention. This screenshot (500) includes: (i) an announcement message (502); (ii) a results message (504); (iii) an inquiry message (506); (iv) a spreadsheet option (508); (v) a map option (510); (vi) a graph option (512); (vii) a save the results of the query option (514); (viii) a save query and begin new query option (516); (ix) an edit query without saving option (518); (x) a save query then edit option (520); (xi) a save query and exit option (522); and (xii) an exit without saving query option (524). FIG. 5 is merely exemplary and not intended to limit the scope of the invention. Other messages may be shown, both for the circumstance of this example as well as for other events. In addition, there may be more or fewer parts to the message, and in a different order, than what is shown in this example. Finally, mechanisms other than pushbuttons may be used to allow the user to communicate the steps to be taken.

The announcement message (502) informs the user that the results of the query are processed and ready to be viewed by the user. Those skilled in the art will appreciate that other words may be used to indicate that the query is complete, and that other enhancements, such as flashing the warning message and adding sound, may be included.

The results message (504) informs the user how many cities were found to rank high based on the information in the system inquiry template (110) of FIG. 1. A high ranking for a city is achieved by having a high relative correlation (which may be defined by default in the system and/or specified by the user) to the business and demographic characteristics of the business in its current location. The results message (504) may also include information from the system inquiry template (110) of FIG. 1. In this example, the results message (504) repeats that the business sells baby supplies, is located in Wilmington, N.C., and the age range of the typical customer is 19-29.

The inquiry message (506) informs the user of a need to determine how she would like to proceed. The following description describes various options for proceeding. The spreadsheet option (508) presents the results of the query in a spreadsheet. In this example, this option is selected by clicking the appropriate pushbutton. The map option (510) presents the results of the query on a map by clicking the appropriate pushbutton. As previously explained, and as described in FIG. 6, the map may be in a format where it shows geographic areas in terms of virtual miles from the city where the business is located. The graph option (512) presents the results from the query on a graph by clicking the appropriate pushbutton. A person of ordinary skill in the art will appreciate that there may be other forms of output in which the data is presented to the user, and also that there are other ways that the user may select these forms of output.

The save the results of the query option (514) allow the user, by clicking the appropriate pushbutton, to save the results of the query. Saving the results of the query is different than saving the query itself in a few respects, the principal respect being that, because information sources are periodically updated with recent data, the results of the same query may change over time. An example of the message presented to the user after saving the results of a query is described in FIG. 7.

The save query and begin new query option (516) allows the user, by clicking the appropriate pushbutton, to save the current query and then begin an entirely new query. Selecting this option saves the information in the system inquiry template (110) of FIG. 1 into a record, which is stored in a repository (e.g., inquiry storage center (106) of FIG. 1). In addition, this option presents the system inquiry template (110) of FIG. 1 for the user, where the fields of the system inquiry template (110) of FIG. 1 may be blank or they may retain the information from the query that was previously submitted.

Continuing with FIG. 5, the edit query without saving option (518) allows the user, by clicking the appropriate pushbutton, to edit the current query without saving it. Selecting this option presents the system inquiry template (110) of FIG. 1 to the user, and all of the fields of the system inquiry template (110) of FIG. 1 are populated with the information that the user entered for the previous query. The user may then create a different query by changing one or more fields in the system inquiry template (110) of FIG. 1.

Continuing with FIG. 5, the save query then edit option (520) allows the user, by clicking the appropriate pushbutton, to save the current query and then edit it. Selecting this option saves the information in the system inquiry template (110) of FIG. 1 into a record, which is stored in a repository (e.g., the inquiry storage center (106)). In addition, this option presents the system inquiry template (110) of FIG. 1 for the user, where the fields of the system inquiry template (110) of FIG. 1 retain the information from the query that was previously submitted. The user may then create a different query by changing one or more fields in the system inquiry template (110) of FIG. 1.

Continuing with FIG. 5, the save query and exit option (522) allows the user, by clicking the appropriate pushbutton, to save the current query and then exit. Selecting this option saves the information in the system inquiry template (110) of FIG. 1 into a record, which is stored in a repository (e.g., the inquiry storage center (106)). In addition, once the record is created and saved, the session ends. The exit without saving query option (524) allows the user, by clicking the appropriate pushbutton, to exit without saving the query.

Figure 6A:
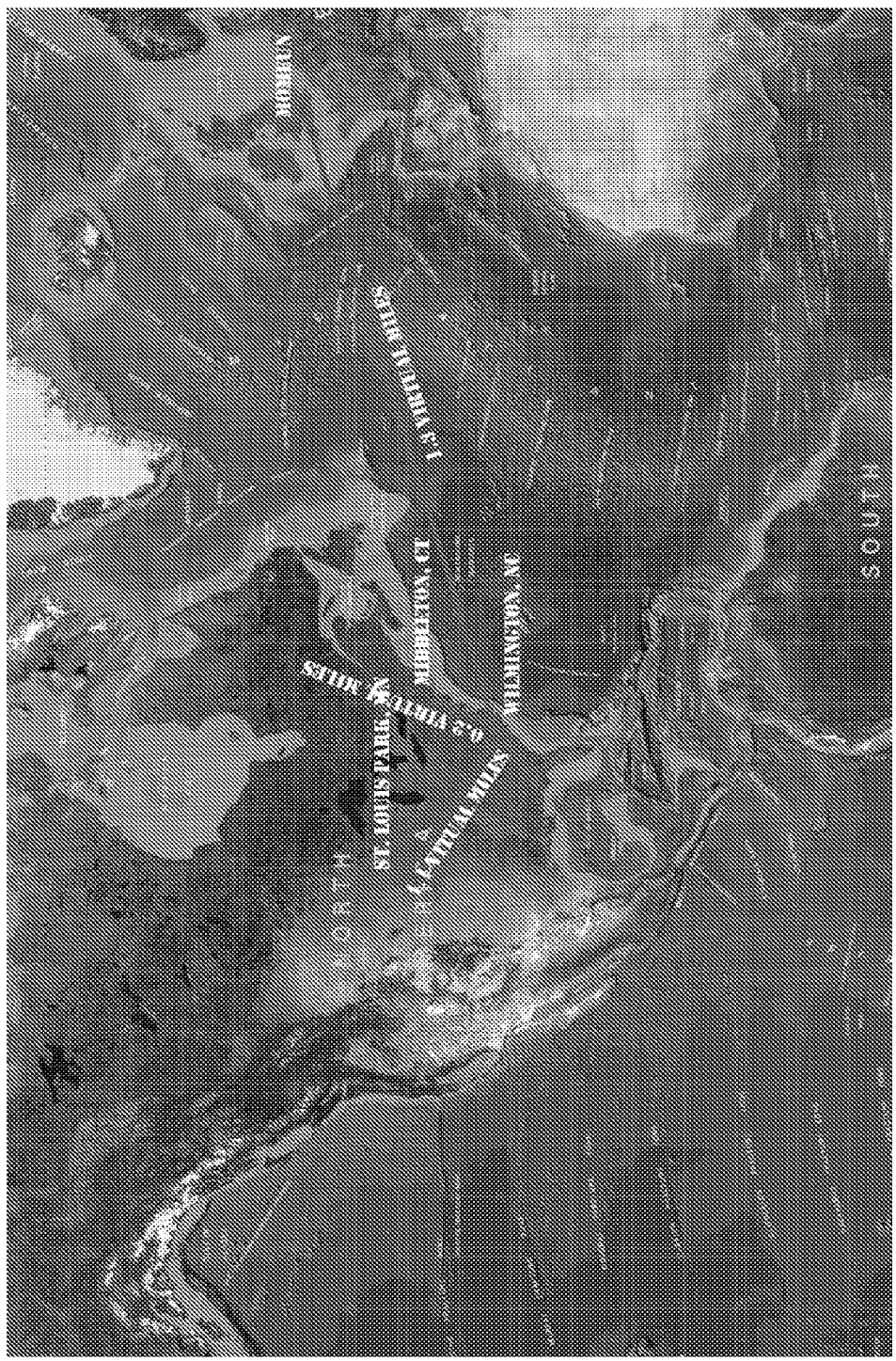
Figure 6B:
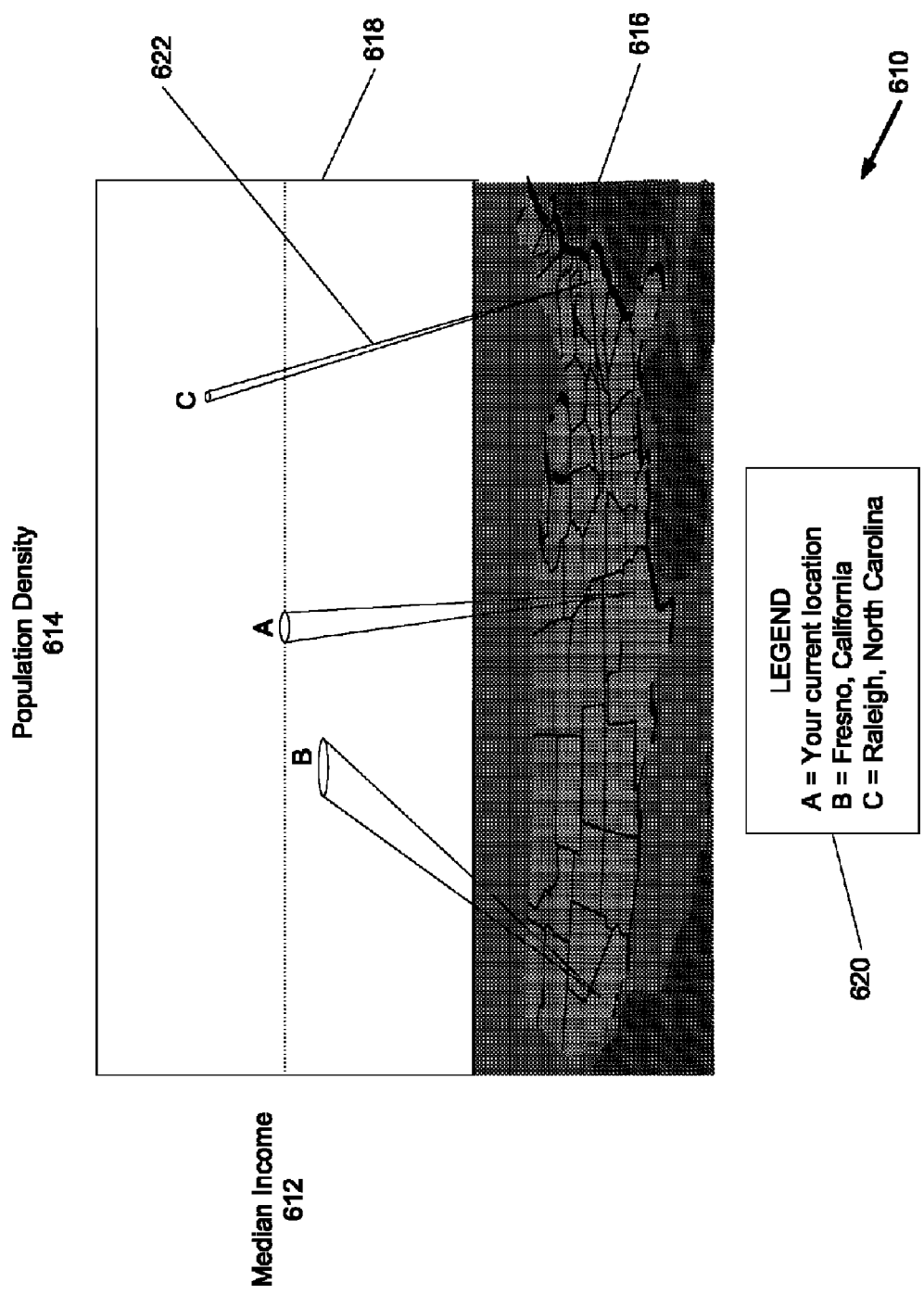

FIGS. 6A-6B each show an example of results of a query in accordance with one or more embodiments of the invention. FIGS. 6A-6B are merely exemplary and not intended to limit the scope of the invention.

In FIG. 6A, the user selects to present the results of the query on the map (600). The map (600) may be shown in a number of varieties and covering a number of geographic areas. One such variety is a virtual map, where the distance from a potential geographic area to the city that the business is located is directly proportionate to the rank order of that potential geographic area under the set of business expansion factors from the query. In other words, the potential geographic area that ranks highest in the query is the shortest distance on the map, in terms of virtual miles, to the city where the business is located. The settings for the virtual map may be defined by default or may be defined by the user. For example, the default settings may dictate that any geographic area with a weighted average score of 95 or higher be shown on the virtual map as being 0.5 miles from the geographic location of the business; any geographic area with a weighted average score between 90 (inclusive) and 95 be shown on the virtual map as being 1.0 mile from the geographic location of the business; any geographic area with a weighted average score between 85 (inclusive) and 90 be shown on the virtual map as being 1.5 miles from the geographic location of the business; and so on.

Continuing with FIG. 6A, alternatively, the user may change the settings of the virtual map such that the geographic areas that finished 1-3 in the rank order be shown on the virtual map as being 1.0 mile from the geographic location of the business; the geographic areas that finished 4-6 in the rank order be shown on the virtual map as being 2.0 miles from the geographic location of the business; and so on. In this example, the map (600) is a virtual map and shows that St. Louis Park, Minn., and Middleton, Conn., are the two geographic locations in the United States that the user, whose business is located in Wilmington, N.C., should consider expanding her business, based on the criteria entered by the user. In addition, the city of Momeun in the southern part of the United Kingdom would be a geographic location outside the United States for the user to expand her business, based on the criteria entered by the user. These geographic locations are within 2 virtual miles of Wilmington, N.C.

In FIG. 6B, the user selects to present the results of the query on a multi-dimensional display (610). In one or more embodiments of the invention, each dimension of the multi-dimensional display may be represented by a business expansion factor where each business expansion factor may be represented on an axis of a Cartesian coordinate plane. In further embodiments of the invention, the multi-dimensional display may be integrated with a map. In one or more embodiments, a geographic location may be represented by a point, a vector, some other type of designation, or any combination thereof. Further, the size of the point, vector, or other type of designation on the multi-dimensional display representing a geographic location may be directly or inversely proportional to one of the business expansion factors. For example, the size of the point may be inversely proportional to the number of existing businesses of the same type. In one or more embodiments of the invention, different colors may be used to designate different geographic locations, business expansion factors, some other characteristic on the graph, or any combination thereof.

Continuing with FIG. 6B, in this example, the display (610) includes a two-dimensional coordinate system (618), a map (616), and a legend (620). The two-dimensional coordinate system (618) includes a vertical axis (612) representing median income and a horizontal axis (614) representing population density. The three results shown on the display (610) are each depicted as a cone (e.g., 622), originating at a point on the map corresponding to a geographic location and ending in a circle. The size of the circle in this case is inversely proportional to the number of existing businesses of the same type in the geographic location. The legend (620) in this example displays that geographic location A is the current location of the business, geographic location B is Fresno, Calif., and geographic location C is Raleigh, N.C. In one or more embodiments of the invention, the legend (620) may include a description of the significance of the size of each circle. In one or more embodiments of the invention, the vertical axis (612) and the horizontal axis (614) may each include one of a number of different types of scales, including but not limited to a range of percentages, a range of numbers, and a range of orders of magnitude.

Those skilled in the art will appreciate that while FIG. 6B shows both a map (616) and a two-dimensional coordinate system (618), the results may be displayed using only the two-dimensional coordinate system (618).

FIG. 7 shows an example of a screenshot (700) presented to the user after the results of the query have been saved in accordance with one or more embodiments of the invention. This screenshot (700) includes: (i) an announcement message (702); (ii) an inquiry message (704); (iii) an edit this query option (706); (iv) a begin new query option (708); (v) an open previous record option (710); and an exit option (712). This example is for explanatory purposes only and is not intended to limit the scope of the invention. Other messages and options may be shown, both for the circumstance of this example as well as for other events. In addition, there may be more or fewer parts to the message or option, and in a different order, than what is shown in this example. Also, while pushbuttons are the mechanism to allow the user to select an option, other mechanisms may be used.

The announcement message (702) notifies the user that the results of the query have been saved. The inquiry message (704) prompts the user to determine what she wants to do next. In this example, the user has four options from which to choose. The edit this query option (706) gives the user, by clicking the appropriate pushbutton, the ability to edit the query whose results are previously saved. Selecting this option presents the system inquiry template (110) of FIG. 1 to the user, and all of the fields of the system inquiry template (110) of FIG. 1 are populated with the information that the user entered for the previous query. The user may then create a different query by changing one or more fields in the system inquiry template (110) of FIG. 1.

Continuing with FIG. 7, the begin a new query option (708) allows the user, by clicking the appropriate pushbutton, to start a new query. This option presents the system inquiry template (110) of FIG. 1 for the user, where the fields of the system inquiry template (110) of FIG. 1 may be blank or may retain the information from a previously submitted query.

Continuing with FIG. 7, the open previous record option (710) allows the user, by clicking the appropriate pushbutton, to select a record from a repository and open that record. The exit option (712) allows the user, by clicking the appropriate pushbutton, to exit.

Figure 8:
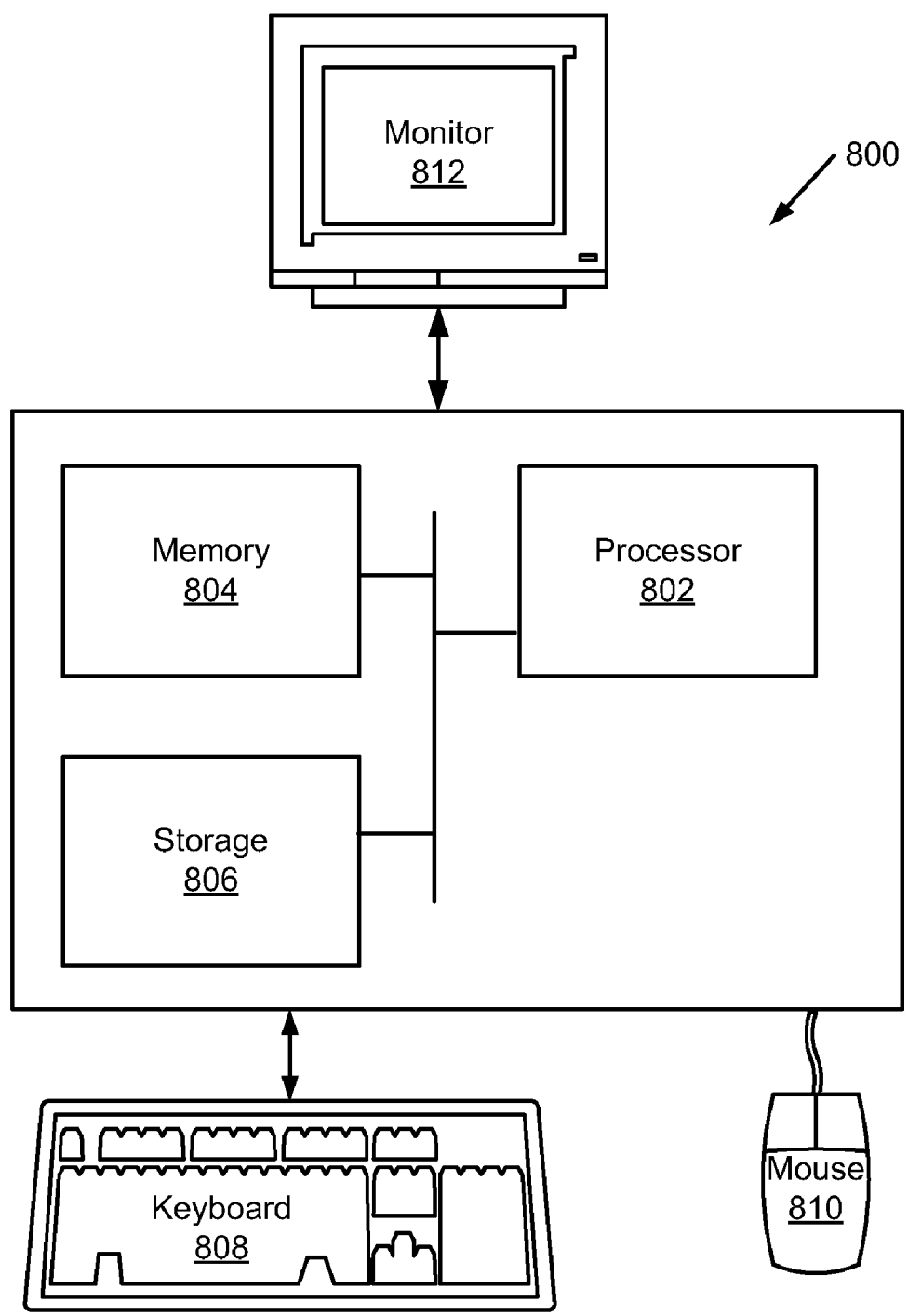
FIG. 8 shows a computer system in accordance with one or more embodiments of the invention.

Embodiments of the invention may be implemented on virtually any type of computer regardless of the platform being used. For example, as shown in FIG. 8, a computer system (800) includes one or more processor(s) (802), associated memory (804) (e.g., random access memory (RAM), cache memory, flash memory, etc.), a storage device (806) (e.g., a hard disk, an optical drive such as a compact disk drive or digital video disk (DVD) drive, a flash memory stick, etc.), and numerous other elements and functionalities typical of today's computers (not shown). The computer system (800) may also include input means, such as a keyboard (808), a mouse (810), or a microphone (not shown). Further, the computer system (800) may include output means, such as a monitor (812) (e.g., a liquid crystal display (LCD), a plasma display, or cathode ray tube (CRT) monitor). The computer system (800) may be connected to a network (814) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (800) includes at least the minimal processing, input, and/or output means necessary to practice embodiments of the invention.

Further, those skilled in the art will appreciate that one or more elements of the aforementioned computer system (800) may be located at a remote location and connected to the other elements over a network. Further, embodiments of the invention may be implemented on a distributed system having a plurality of nodes, where each portion of the invention (e.g., the system inquiry template, the inquiry record(s), the inquiry storage center, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method for evaluating expansion of a business where the business is located in a first geographic area, comprising:
   receiving information about the business from a system inquiry template, wherein the information about the business comprises location information, demographic information, and a business type;
   querying, using a computer processor, a business information source and a demographic information source using the information;
   receiving, using the computer processor, data from the business information source and the demographic information source in response to the querying, wherein the data comprises economic information related to a plurality of geographic areas;
   processing, using the computer processor, the data using a business expansion factor to generate processed data, wherein processing the data using the business expansion factor comprises:
   comparing a value for the business expansion factor for the first geographic area to a value for the business expansion factor for one of the plurality of geographic areas;
   obtaining, based on the comparing, a plurality of potential geographic areas for expanding the business, wherein the processed data comprises the plurality of potential geographic areas for expanding the business, and
   wherein the plurality of potential geographic areas are evaluated on the business expansion factor to determine a similarity to the first geographic area to obtain a rank order,
   wherein the rank order is determined by a weighted-average of the business expansion factor;
   generating, using the processed data, a map displaying the plurality of potential geographic areas using a scale proportionate to the rank order of the plurality of potential geographic areas; and
   presenting the map on a visual display.

2. The method of claim 1, wherein the system inquiry template comprises a plurality of fields comprising at least one selected from a group consisting of a state, province, territory, or other division of land in a country of the business location, a city of the business location, an age range of a typical customer for the business, a type of business, an annual gross revenue range, and a country of interest.

3. The method of claim 1, wherein the business expansion factor comprises at least one selected from a group consisting of an overall population, a population within a range of ages, a per capita income, a number of businesses of the same type, and an annual gross revenue of the businesses of the same type.

4. The method of claim 1, wherein the demographic information source tracks demographic elements comprising at least one selected from a group consisting of population, income, age, sexual and cultural diversity, and economics related to a country of interest.

5. The method of claim 1, wherein the business information source tracks business elements comprising at least one selected from a group consisting of financial, industry, and performance data related to a type of business in a country of interest.

6. The method of claim 1, wherein the business information source is a financial application used by another business.

7. The method of claim 1,
   wherein the scale used for the map listing the plurality of potential geographic areas is a plurality of sizes of a plurality of shapes,
   wherein each of the plurality of sizes is proportionate to the rank order of the plurality of potential geographic areas so that a potential area of the plurality of potential geographic areas having a highest rank in the rank order has a largest size of a shape compared to a size of the shape for any other potential geographic area of the plurality of potential geographic areas.

8. The method of claim 7,
   wherein the shape is a cone,
   wherein each cone originates at a point on the map corresponding to one of the plurality of potential geographic areas,
   wherein the map is presented on a multi-dimensional display,
   wherein the business expansion factor is one of a plurality of business expansion factors used to process the data,
   wherein each dimension of the multi-dimensional display represents one of the plurality of business expansion factors, and
   wherein a top of each cone is shaped according to the business expansion factors of the corresponding potential geographic area.

9. A non-transitory computer readable medium embodying instructions executable by a processor to perform method steps for evaluating business expansion, the instructions comprising functionality to:
   receive information about the business from a system inquiry_template, wherein the information about the business comprises location information, demographic information, and a business type;
   query a business information source and a demographic information source using the information;
   receive data from the business information source and the demographic information source in response to the querying, wherein the data comprises economic information related to a plurality of geographic areas;
   process the data using a business expansion factor to generate processed data, wherein processing the data using the business expansion factor comprises:
   comparing a value for the business expansion factor for the first geographic area to a value for the business expansion factor for one of the plurality of geographic areas;
   obtaining, based on the comparing, a plurality of potential geographic areas for expanding the business,
   wherein the processed data comprises the plurality of potential geographic areas for expanding the business, and
   wherein the plurality of potential geographic areas are evaluated on the business expansion factor to determine a similarity to the first geographic area to obtain a rank order,
   wherein the rank order is determined by a weighted-average of the business expansion factor;
   generate, using the processed data, a map displaying the plurality of potential geographic areas using a scale proportionate to the rank order of the plurality of potential geographic areas; and
   present the map on a visual display.

10. The non-transitory computer readable medium of claim 9, wherein the system inquiry template comprises a plurality of fields comprising at least one selected from a group consisting of a state, province, territory, or other division of land in a country of the business location, a city of the business location, an age range of a typical customer for the business, a type of the business, an annual gross revenue range, and a country of interest.

11. The non-transitory computer readable medium of claim 9, wherein the business expansion factor comprises at least one selected from a group consisting of an overall population, a population within a range of ages, a per capita income, a number of businesses of the same type, and an annual gross revenue of the businesses of the same type.

12. The non-transitory computer readable medium of claim 9, wherein the demographic information source tracks demographic elements comprising at least one selected from a group consisting of population, income, age, sexual and cultural diversity, and economics related to a country of interest.

13. The non-transitory computer readable medium of claim 9, wherein the business information source tracks business elements comprising at least one selected from a group consisting of financial, industry, and performance data related to a type of business in a country of interest.

14. The non-transitory computer readable medium of claim 9, wherein the processed data is plotted on the map.

15. The computer readable medium of claim 9,
wherein the scale used for the map listing the plurality of potential geographic areas is a plurality of sizes of a plurality of shapes,
wherein each of the plurality of sizes is proportionate to the rank order of the plurality of potential geographic areas so that a potential area of the plurality of potential geographic areas having a highest rank in the rank order has a largest size of a shape compared to a size of the shape for any other potential geographic area of the plurality of potential geographic areas.

16. The computer readable medium of claim 15,
wherein the shape is a cone, wherein each cone originates at a point on the map corresponding to one of the plurality of potential geographic areas,
wherein the map is presented on a multi-dimensional display,
wherein the business expansion factor is one of a plurality of business expansion factors used to process the data,
wherein each dimension of the multi-dimensional display represents one of the plurality of business expansion factors, and
wherein a top of each cone is shaped according to the business expansion factors of the corresponding potential geographic area.

17. A system for evaluating business expansion, comprising:
a computer processor;
an inquiry storage center executing on the computer processor and configured to store a system inquiry template and inquiry records;
a business growth networking system executing on the computer processor and operatively connected to a business information source, a demographic information source, and the inquiry storage center, wherein the business growth networking system is configured to:
receive information about the business from a system inquiry_template, wherein the information about the business comprises location information, demographic information, and a business type;
query the business information source and the demographic information source using the information;
receive data from the business information source and the demographic information source in response to the querying, wherein the data comprises economic information related to a plurality of geographic areas;
process the data using a business expansion factor to generate processed data, wherein processing the data using the business expansion factor comprises:
comparing a value for the business expansion factor for the first geographic area to a value for the business expansion factor for one of the plurality of geographic areas;
obtaining, based on the comparing, a plurality of potential geographic areas for expanding the business,
wherein the processed data comprises the plurality of potential geographic areas for expanding the business, and
wherein the plurality of potential geographic areas are evaluated on the business expansion factor to determine a similarity to the first geographic area to obtain a rank order,
wherein the rank order is determined by a weighted-average of the business expansion factor;
generate, using the processed data, a map displaying the plurality of potential geographic areas using a scale proportionate to the rank order of the plurality of potential geographic areas; and
present the map on a visual display.

18. The system of claim 17, wherein the system inquiry template comprises a plurality of fields comprising at least one selected from a group consisting of a state, province, territory, or other division of land in a country of the business location, a city of the business location, an age range of a typical customer for the business, a type of business, an annual gross revenue range, and a country of interest.

19. The system of claim 17, wherein the business expansion factor comprises at least one selected from a group consisting of an overall population, a population within a range of ages, a per capita income, a number of businesses of the same type, and an annual gross revenue of the businesses of the same type.

20. The system of claim 17, wherein the demographic information source tracks demographic elements comprising at least one selected from a group consisting of population, income, age, sexual and cultural diversity, and economics related to a country of interest.

21. The system of claim 17, wherein the business information source tracks business elements comprising at least one selected from a group consisting of financial, industry, and performance data related to a type of business in a country of interest.

22. The system of claim 17, wherein the processed data is plotted on the map.

23. The system of claim 17,
wherein the scale used for the map listing the plurality of potential geographic areas is a plurality of sizes of a plurality of shapes,
wherein each of the plurality of sizes is proportionate to the rank order of the plurality of potential geographic areas so that a potential area of the plurality of potential geographic areas having a highest rank in the rank order has a largest size of a shape compared to a size of the shape for any other potential geographic area of the plurality of potential geographic areas.

24. The system of claim 23,
wherein the shape is a cone,
wherein each cone originates at a point on the map corresponding to one of the plurality of potential geographic areas,
wherein the business expansion factor is one of a plurality of business expansion factors used to process the data
wherein the map is presented on a multi-dimensional display, wherein each dimension of the multi-dimensional display represents one of the plurality of business expansion factors, and
wherein a top of each cone is shaped according to the business expansion factors of the corresponding potential geographic area.

* * * * *